United States Patent
Billonneau et al.

(10) Patent No.: US 9,148,821 B2
(45) Date of Patent: Sep. 29, 2015

(54) SYSTEM FOR MANAGING THE ALLOCATION OF THE RESOURCES OF A SATELLITE LINK IN A TELECOMMUNICATION NETWORK

(75) Inventors: Dominique Billonneau, Gennevilliers (FR); Nicolas Suard, Gennevilliers (FR); Jean-François Gault, Le Bourget (FR); François Goudal, Le Bourget (FR)

(73) Assignee: THALES, Courbevoie (FR)

( * ) Notice: Subject to any disclaimer, the term of this patent is extended or adjusted under 35 U.S.C. 154(b) by 92 days.

(21) Appl. No.: 13/811,275

(22) PCT Filed: Jul. 21, 2011

(86) PCT No.: PCT/EP2011/062550
§ 371 (c)(1),
(2), (4) Date: Jul. 2, 2013

(87) PCT Pub. No.: WO2012/010664
PCT Pub. Date: Jan. 26, 2012

(65) Prior Publication Data
US 2013/0336119 A1    Dec. 19, 2013

(30) Foreign Application Priority Data
Jul. 21, 2010  (FR) .................................... 10 03075

(51) Int. Cl.
| | |
|---|---|
| H04L 12/26 | (2006.01) |
| H04W 28/10 | (2009.01) |
| H04W 76/02 | (2009.01) |
| H04W 28/02 | (2009.01) |
| H04L 12/927 | (2013.01) |
| H04W 84/06 | (2009.01) |
| H04W 92/02 | (2009.01) |
| H04L 12/911 | (2013.01) |

(52) U.S. Cl.
CPC ............. *H04W 28/10* (2013.01); *H04L 47/805* (2013.01); *H04W 28/0263* (2013.01); *H04W 76/022* (2013.01); *H04L 47/824* (2013.01); *H04W 84/06* (2013.01); *H04W 92/02* (2013.01)

(58) Field of Classification Search
CPC .......................... H04W 28/0263; H04W 28/10
See application file for complete search history.

(56) References Cited

U.S. PATENT DOCUMENTS

| 7,756,040 B1 | 7/2010 | Andriantsiferana et al. |
| 2013/0155948 A1* | 6/2013 | Pinheiro et al. ............... 370/328 |

FOREIGN PATENT DOCUMENTS

WO    2009/143063 A1    11/2009

OTHER PUBLICATIONS

"3rd Generation Partnership Project; Technical Specification Group Services and System Aspects; Digital Cellular Telecommunications system (Phase 2+); General Packet Radio Service (GPRS); Service Description; Stage 2 (3G TS 23.060 version 3.2.0.)", 3rd Generation Partnership Project , pp. 1-180, Dec. 1, 1999, No. V3.2.0, Mobile Competence Centre, FR, XP050362254.

*Primary Examiner* — Huy D Vu
*Assistant Examiner* — Kevin Cunningham
(74) *Attorney, Agent, or Firm* — Baker & Hostetler LLP

(57) ABSTRACT

A service manager intended to be positioned in a telecommunications network implementing a satellite and one or more user networks, the communication protocol relying on the 3G standard or implementing TFT and PDP rules, comprises at least the following modules: a link configuration module which contains one or more static configurations that can be modified by a user, an external-events manager module, a traffic detector module, a configured-TFTs traffic detector plugin, a TFTs management module, a Secondary PDP context management module.

8 Claims, 2 Drawing Sheets

SYSTEM FOR MANAGING THE ALLOCATION OF THE RESOURCES OF A SATELLITE LINK IN A TELECOMMUNICATION NETWORK

CROSS-REFERENCE TO RELATED APPLICATIONS

This application is a National Stage of International patent application PCT/EP2011/062550, filed on Jul. 21, 2011, which claims priority to foreign French patent application No. FR 1003075, filed on Jul. 21, 2010, the disclosures of which are incorporated by reference in their entirety.

FIELD OF THE INVENTION

The invention relates to a system allowing a user network to allocate the resources of a satellite link in a telecommunication network so as to ensure excellent quality of service while reducing the cost of the service.

The system according to the invention makes it possible notably to dynamically (automatically) allocate for example BGAN Inmarsat guaranteed-throughput channels of optimized dimensions.

More generally, the system may be implemented in any telecommunication network using TFT rules which function is to assign frames identified by discriminators to secondary PDP contexts (the initials standing for "packet data protocol") of "streaming" type, for example GPRS, the abbreviation standing for General Packet Radio Service.

The initials TFT better known by the expression "Traffic Flow Template" designate a series of filters which ensures a determined path for applications whose flow is identified by the TFT filters.

In the description which follows the word "streaming" designates a class of satcom services guaranteeing a guaranteed throughput (used mainly for real-time applications). The word "transceiver" is used to designate a transmitter/receiver whose function is notably to broadcast an input signal to several outputs.

The system takes the form of an onboard platform which may be aboard an aircraft, a ship, a vehicle or in a suitcase and of a ground platform which interfaces with the public or private networks. The onboard platform serves a network using the IP Internet protocol to which computer equipment (data, voice or phone, video etc. . . . ) is connected.

BACKGROUND

In telecommunication networks using a satellite, two types of category of services are proposed:
  A service of best effort type where the user pays by the Mega byte consumed, but he has no guarantee of quality of service. That is to say if there are many simultaneous uses on the satellite link, quality is greatly degraded. For telephone services over IP (Internet Protocol) or for videoconferencing, this is unacceptable.
  A service of streaming type for which the user pays by the duration of connection (very high price), but which, on the other hand, has a guarantee of service which allows it to ensure real-time services, such as voice or video or else priority use of the satellite resource.

These services are currently opened manually as a function of a user's requirement.

A session in the Best Effort mode is initialized for transmissions with no bandwidth guarantee and if a bandwidth guarantee requirement is necessary, then the Best Effort session is stopped in favour of the opening of a "streaming" session. This mode of operation is constraining, in fact imposing that, for reasons of simplicity, the users remain in the Best Effort mode.

Adding to this, it is necessary to choose the size of the streaming that one wishes to open. In the case of Services which may fluctuate (such as telephony for example for which it is difficult to foretell how many people will call, when and for what duration), the resource must remain open almost permanently. This gives rise to unacceptable communication costs (for example, 128-kbps streaming possesses a very high operating cost).

The solutions proposed on the market are:
  Either very expensive, since the streaming resource is overdimensioned with respect to the requirement (in terms of connection time and streaming size), therefore with a very high usage cost,
  Or of poor quality, by using Best Effort, there is no quality of service; after a few communications, the quality deteriorates significantly.

Moreover, these procedures do not solve, notably, the identification of requirements for implementing the opening and closing of the resources in a dynamic manner.

SUMMARY OF THE INVENTION

The object of the present invention relates to a system which is applicable notably to data transmissions which require a guaranteed bandwidth and for which neither the volume to be transmitted nor the duration is known. The proposed solution makes it possible to open and to close these resources in a dynamic manner, as a function of a given user's requirement. The solution makes it possible to open a streaming channel as soon as the user forwards a communication or transmits data requiring a guaranteed bandwidth, and releases the channel as soon as the communication has terminated.

The subject of the invention relates to a service manager intended to be positioned in a telecommunications network implementing a satellite and one or more user networks, the communication protocol relying on the 3G standard or implementing TFT and PDP rules, characterized in that it comprises at least the following modules:
  a link configuration module which contains one or more static configurations that can be modified by a user,
    an input which allows a user to specify TFT data to be used,
    three outputs: a second output, linked to the TFT manager, a third output, linked to a traffic detector module, a fourth output, linked to a secondary PDP context manager,
  a traffic detector module which scans each IP packet transmitted within the system between a user network and a satellite, the said detector comprising the following submodule:
    a configured-TFTs traffic detector plugin which comprises:
      an input which receives the information from the links configuration module,
      an output which transmits information of presence or absence of flow related to activated TFTs, to the secondary PDP context manager.
  a TFTs management module comprising
    three inputs: a first input, receiving the information from the links configuration module,
    two inputs/outputs: linked up with the "transceiver" which allows the communication of the status creations or "get created status" instructions, to the secondary PDP contexts management module which exchanges information of Get/release free PDP contents type,
an output to the "transceiver" T which will create TFTS rules and link them to an available context or else delete TFTs
a secondary PDP context management module; the said module comprises
three inputs: a first input which receives information from the configuration module, a second input which receives information from the TFTs manager, a third input which receives information from configured-TFTs traffic detector plugin,
an output which transmits the activation or deactivation commands to the transceiver for all the secondary PDP contexts.

Traffic detector module comprises, for example, a container module for plugins for creating/deleting TFTs comprising an input, receiving information from the links configuration module, an output transmitting information on the parameters of analysed traffic, the class, etc. to the TFTs manager via input, said container module comprises at least one of the following sub-modules:
a plugin for detecting specific packets which detects a simple packet which corresponds to a pattern or template,
a plugin for detecting type of traffic, detecting the presence of a traffic flow of a specified type,
a plugin for detecting other traffic detecting other criteria characterizing a traffic flow.

The service manager comprises, for example, an optional external-events manager module comprising an input receiving information from the links configuration module via output, output transmitting information to the TFTs manager.

The Secondary PDP context management module, comprises an input/output linked up with the transceiver for the request/response statuses for the contexts.

The system may be used in an Inmarsat telecommunications system or in a mobile telecommunications system.

These devices being known to the person skilled in the art by the following terms: "Specific packet detection plugin, traffic type detection plugin, other traffic specification detection plugin."

The service manager according to the invention is, for example, used in an Inmarsat telecommunications system or in a mobile telecommunications system.

BRIEF DESCRIPTION OF THE DRAWINGS

Other characteristics and advantages of the device according to the invention will be more apparent on reading the description which follows of an exemplary embodiment given by way of wholly nonlimiting illustration together with the figures which represent.

DETAILED DESCRIPTION

In order to better elucidate the subject of the present invention, the description which follows will be given within the framework of usage in a BGAN Inmarsat system, operating with the 3GPP communication protocol which makes it possible to ensure maintenance and development of the technical specifications for the GSM (abbreviation standing for Global System Mobile), GPRS (General Packet Radio Service), EDGE (Enhanced Data Rate) mobile standards, for example.

The idea of the present invention is based on the use of a server added to an existing satellite telecommunication network of BGAN Inmarsat type. The latter is embedded onboard the platform serving the communications (aeroplane, boat, etc.). The function of this server is notably to manage the opening and closing of the BGAN Inmarsat streaming channels.

More generally, it applies in all telecommunications networks which use a primary and secondary PDP context management mechanism and on the TFT mechanism.

Figure 1:
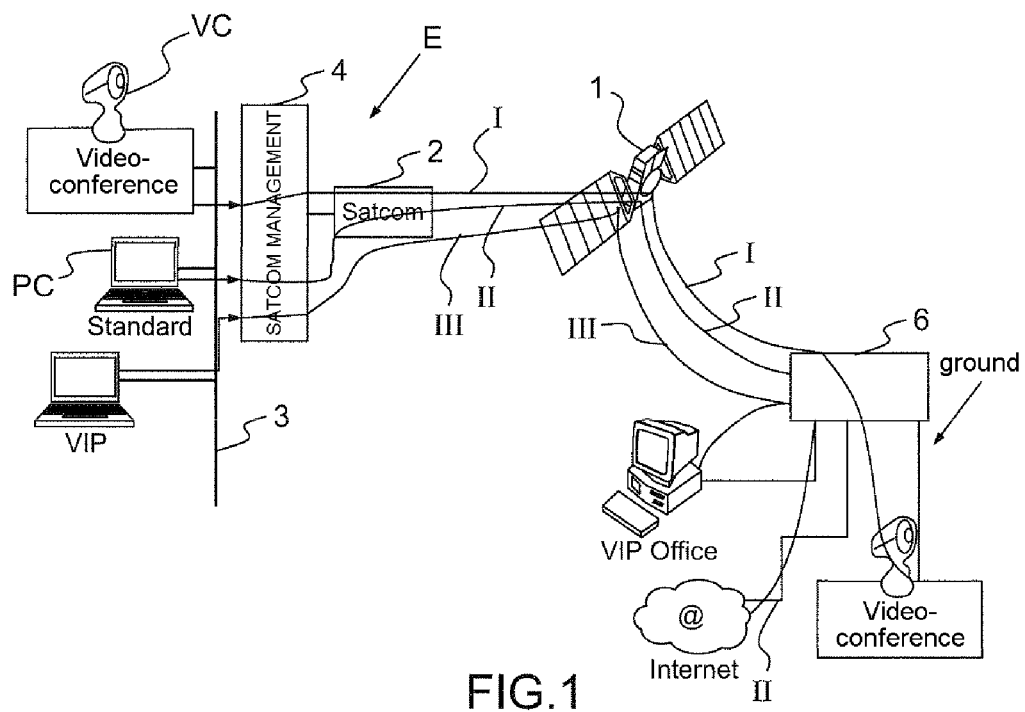
FIG. 1, an exemplary architecture of a telecommunication system with satellite.

FIG. 1 describes an exemplary telecommunications architecture comprising a BGAN Inmarsat network, 1, which communicates with an onboard platform E that contains a Satcom module 2, linked to an IP transport and data network 3, the whole being managed by the satcom management server 4. Connected to the transport network are for example a videoconference device VC, a standard PC, a Voice over IP or VIP device.

The BGAN Inmarsat network 1 is also linked in this exemplary implementation to a ground platform 6 which serves an IP network to which are connected services of VIP office, Internet, Videoconference type.

In FIG. 1, scheme I corresponds to the 128-K video streaming service allowing communication between videoconference systems, scheme II for the Best Effort service used for data transport and exchange, scheme III being reserved for communications of voice over IP or VIP type.

The onboard platform E can be situated aboard an aircraft, a ship, a vehicle or in a suitcase and the ground platform interfaces with the public or private networks according to techniques known to the person skilled in the art.

The explanations which follow may be implemented in any type of satellite telecommunication network operating with the 3GPP communication protocol.

The BGAN Inmarsat communication service makes it possible to create several network links between a Satcom terminal and the terrestrial Inmarsat network. Accordingly, it is possible to assign several IP addresses for one and the same satcom terminal, each IP address being assigned to a link. This link is associated with a primary context. The term "context" designates the environment in which the data transmissions take place. Each type of traffic that it is desired to differentiate is associated with a secondary PDP context by the TFT rules. The TFT rule which makes it possible to activate the streaming channels so as to transmit the communications is a rule defined by the size of the frames processed.

All the channels of one and the same "link" have one and the same address, that of the "link".

This solution is adaptable for each type of traffic identifiable in the TFT rules (e.g.: voice over IP VoIP, video data, etc. . . . ). It makes it possible in respect of the data to have nonguaranteed-bandwidth transmissions and guaranteed bandwidth transmissions with activation and release of the channel in a dynamic manner.

Figure 2:
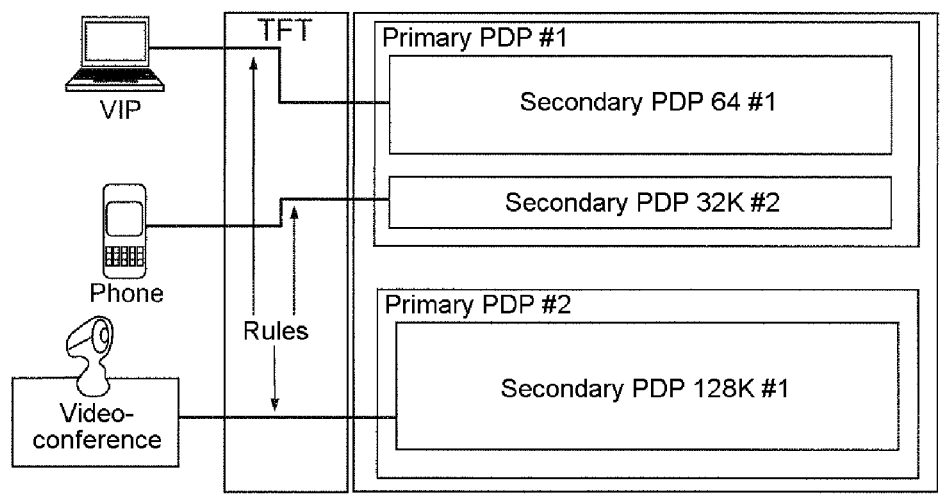
FIG. 2, a "streaming" scheme.

FIG. 2 is an exemplary "streaming" service scheme. The setup implemented relies, for example, on the BGAN Inmarsat mechanism for managing primary and secondary PDP contexts and on the TFT mechanism.

The BGAN Inmarsat network manages, for example, the resources by means of the Packet Data Protocol or PDP contexts. Each data connection between the Satcom terminal of the mobile platform and the Inmarsat network is described by its PDP. The PDP context which is negotiated between the terminal and the BGAN Inmarsat network contains the elements describing the connection and in particular the routing by Access Point Name or APN which is the exit point of the BGAN Inmarsat network, the quality of service QoS, Best Effort, Streaming, and the billing associated with these data.

One or more BGAN Inmarsat primary contexts are open with the BestEffort quality of service for the traffic not requiring any guaranteed bandwidth. One or more secondary contexts are created but not activated for each type of traffic requiring a Streaming mode. The secondary contexts of one and the same primary PDP context share the same APN and the same IP address as the primary link to which they are attached; on the other hand, their quality of service may be different.

The primary BGAN Inmarsat context, Link, is activated on startup.

The secondary BGAN Inmarsat contexts, channels, are created just after the establishment of the primary context but are not activated.

TFT Rules

The TFT is a filter series which ensures a determined path for applications whose flow is identified by the TFT filters. The application of the TFT rules is based on the knowledge: of the characteristics of the traffic flow or flows which will use the streaming and are used to transport the calls. For example, at most 8 TFT rules may be defined per PDP context in the system and 11 PDP contexts may be activated simultaneously per terminal. Each TFT rule may use one or more criteria from among the available list. These criteria are applicable in the uplink or downlink direction. The TFT rules may be created dynamically and the creation characteristics for these rules are in a satcom management application configuration file.

Figure 3:
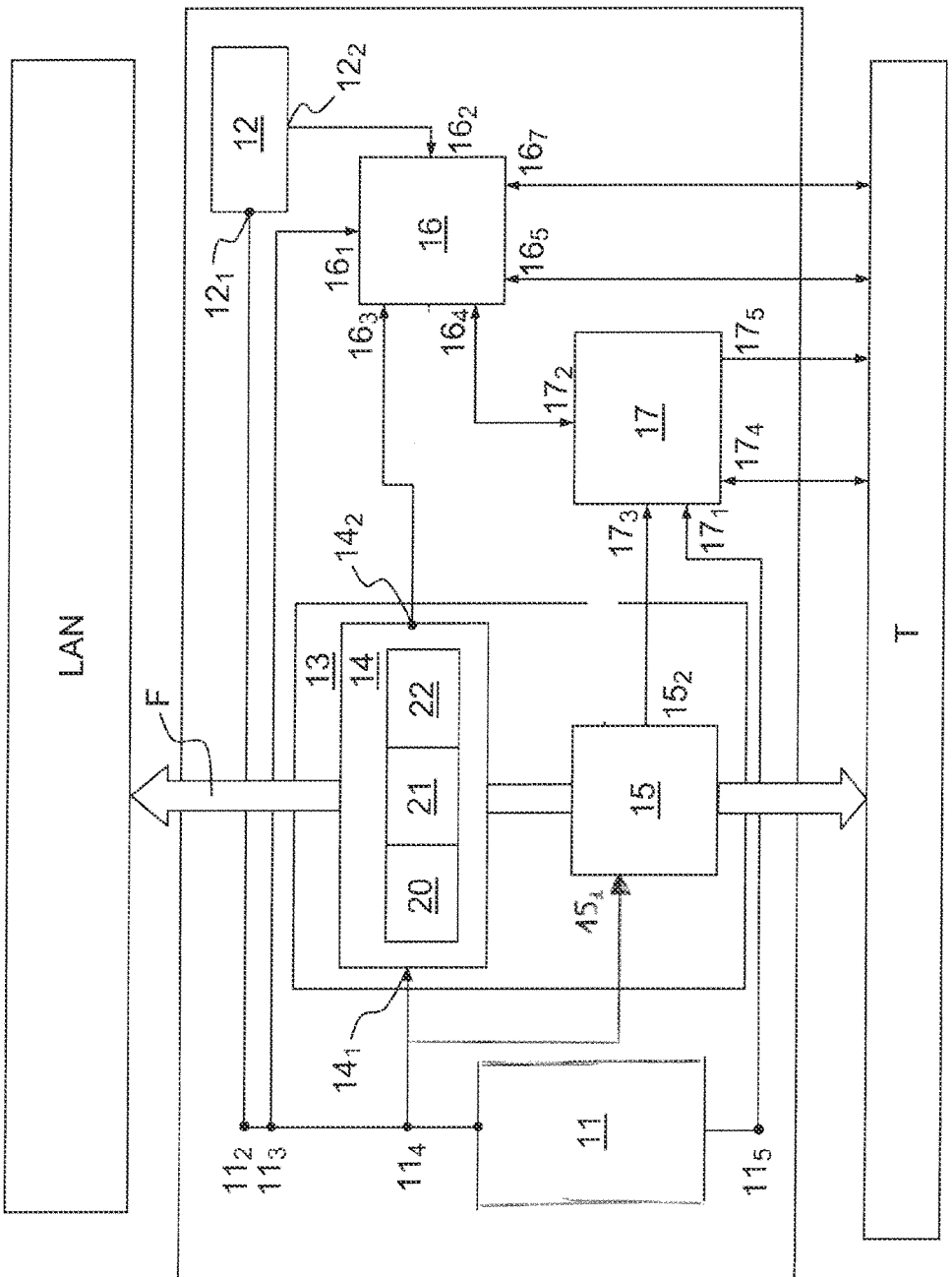
FIG. 3, an example of an exemplary architecture of the system according to the invention, disposed between a LAN user network and a transmitter/receiver, router system.

FIG. 3 describes the various modules implemented in the Quality of Service manager making it possible to ensure quality of service for a LAN network user.

The quality of service manager 10 according to the invention is disposed between a user's LAN network and the transceiver T (FIG. 3) of the satellite telecommunication network.

This service manager 10 comprises for example the following elements:
  a link configuration module 11 which contains the static configuration, that can be modified by a user. The module 11 for configuring links comprises, for example,
    an input $11_1$ which allows a user to specify TFT data to be used,
    4 outputs: a first output $11_2$, optional, which is linked to an optional external-events manager, a second output $11_3$, linked to the TFT manager, a third output $11_4$, linked to a traffic detector module 13 via inputs $14_1$ and $15_1$, a fourth output $11_5$, linked to a secondary PDP contexts manager.

The links configuration module contains the following information:
  the TFT creation mode: i.e. via information of a traffic detector or of an external event,
  the specification of external events: if the TFT creation mode is generated by an external event, then the link configuration module contains the specification of the event,
  the TFT mode creation "plugin" used: if the TFT creation mode is generated by the traffic detector then the specification of the "plugin" used is present,
  the TFT creation model: skeleton of the TFT with the specification of dynamic parameters, for which the value will be defined up to detection of traffic or other means etc.
  the IDs allocated for the secondary context,
  the TFT deletion mode either via the traffic detector or by means of an external event,
  the TFT deletion event: if the TFT deletion mode is generated by the external event, then the specification of the event,
  a used TFT erasure plugin if the TFT deletion mode is generated by the traffic detector, then the links configuration module contains the specification of the plugin of the traffic detector used (ref creation/deletion TFT hereinbelow).

This file is configured, for example, on system initialization. It is also possible to specify elements of the TFT as dynamic elements which will depend on the traffic or the traffic flow analysed.

Thus, it is possible to have static TFTs or dynamic TFTs.

On initialization of the dynamic manager of the quality of service, the configuration of the system, containing the quality of service (QoS) to be applied as a function of the traffic as indicated hereinabove, will be transmitted to the various modules.

An optional external-events manager module 12 the function of which is notably to manage the events specified as a function of a given configuration and which will require the creation or the deletion of a TFT, The external-events manager module comprises, for example,
  an input $12_1$ receiving information from the links configuration module,
  an output $12_2$ transmitting information to the TFTs manager A traffic detector module 13 which scans each IP packet transmitted within the system. The IP traffic detector contains the following sub-modules:
  An optional TFTs creation/deletion plugins "container" module 14,
  TFT creation/deletion plugins combine the configuration of the links with predefined filters to create a specific traffic pattern which may be detected in the IP traffic flow. Upon detection, it will generate requests for the creation or the deletion of the TFTs for a specific context. The plugin may be taken from the following list:
    The plugin for detecting specific packets; detects a simple packet which corresponds to a pattern or template, 20
    The plugin for detecting type of traffic, detects the presence of a traffic flow of a specified type, 21
    The plugin for detecting other traffic; detects other criteria characterizing a traffic flow (for example, the size of a packet), 22

The optional module 14 comprises an input $14_1$, receiving information from the links configuration module, output $14_2$ transmitting information on the parameters of analysed traffic, the class, etc. to the TFTs manager 16.

The configured-TFTs traffic detector plugin 15; detects the traffic corresponding to the traffic pattern specified in the TFTs created and informs the PDP secondary context manager of this detection.

The configured-TFTs traffic detector comprises, for example,
  an input $15_1$ which receives the information from the links configuration module via output $11_4$,
  an output $15_2$ which transmits information to the PDP secondary context manager, such as the activated TFTs which are detected in the flow, the secondary context of the PDPs.

A TFTs management module 16: creates and deletes the TFTs; manages the status of the TFTs of the contexts at the receiver/transmitter level and informs the configured-TFTs traffic detector plug-in of the status of the contexts.

The management module 16 comprises:
three inputs:
$16_1$ receiving the information from the links configuration module, an input $16_2$ which receives information from the external-event manager, an input $16_3$ which receives information on the parameters of analysed traffic, the class, etc,
two inputs/outputs:
$16_5$ linked up with the transceiver which allows the communication of the "get created status" instructions,
$16_4$ to the manager to handle PDP secondary contexts which exchanges information of Get/release free PDP contents type,
an output $16_7$ to the transceiver T which will create TFTSs and link them to an available context or else delete TFTs A PDPs context management secondary module, 17; activates and deactivates the contexts, manages the status of the context of the transceiver.

The module 17 comprises three inputs:
$17_1$ which receives information from the configuration module,
$17_2$ which receives information from the TFTs manager,
$17_3$ which receives information on the part of the configured-TFTs traffic detector plugin,
an output $17_5$ which transmits the activation or deactivation commands to the transceiver for all the secondary PDP contexts,
an optional input/output $17_4$ linked up with the transceiver for the request/response statuses for the contexts.

The arrow F designates a bidirectional traffic flow of the data or information flows between a LAN user network and the transceiver T.

The operation of the system described in FIG. 3 can comprise the steps listed hereinafter.

On startup, the configuration of the system is distributed in the modules of the quality of service manager according to the invention. There therefore exists a preconfiguration in static mode.

In the case where TFTs ought to be created as a function of the analysis of the flow, then the traffic detector will be configured so as to detect the corresponding traffic flow by using suitable flow analysis plugins.

Upon detection of a traffic flow corresponding to a TFT creation criterion, then the traffic detector informs the TFTs management module. This information can comprise TFT parameters and the traffic class.

The TFT manager will ask the secondary PDP context manager for an available PDP context and it will create one or more TFTs, according to a given configuration, and will link these TFTs to the PDP context allocated to a specified class.

The TFT manager will check the status of the transceiver so as to ensure the persistence of the TFTs presumed to have been created.

The plugin for detecting the configured TFTs will detect the traffic on the TFTs created and upon detection, will inform the manager of the PDP secondary context.

The manager of the PDP secondary context will thereafter activate the relevant context, so as to have the traffic corresponding to the identified TFT, directed towards this context.

Upon detection of a traffic flow corresponding to a TFT in place by the plugin for detecting the configured TFTs, the traffic detector will inform the TFTs management module, and in an optional manner will specify parameters of the TFTs.

The plugin for detecting the configured TFT rules will detect the prolonged absence of traffic previously present and will inform the manager of the secondary PDP contexts which will deactivate the corresponding context. The TFTs manager will delete the relevant TFTs.

Another way of proceeding, without departing from the scope of the invention, consists in using the event manager in place of the IP traffic detector.

The system according to the invention allows a BGAN Inmarsat Satcom type telecommunication network user to forget about the opening or closing of the Satcom resources, while having a guarantee of optimization of these resources and a guarantee of quality of service.

The system according to the invention makes it possible to:
Transmit traffic in the best effort:
Internet
FTP
Signalling of telephony type (SIP)
To assign the communication to a channel having a guaranteed quality of service as soon as the requirement is established and corresponds to a TFT rule Payment by the minute of the guaranteed throughput is triggered only when transmission is established
Transmit traffic in streaming mode for
Video
Voice (SIP)
Priority data (VIP)
Sensitive data with guarantee of carriage
To release the guaranteed resource as soon as the communication is ended, payment by the minute of the guaranteed throughput is stopped

The invention claimed is:

1. A service manager system intended to be positioned in a telecommunications network implementing a satellite and one or more user networks, a communication protocol relying on a 3G standard and implementing Traffic Flow Template (TFT) and Packet Data Protocol (PDP) rules, the service manager system comprising:
a link configuration module which contains one or more static configurations that can be modified by a user;
an input which allows the user to specify TFT data to be used;
three outputs: a second output linked to a TFT manager, a third output linked to a traffic detector module, a fourth output linked to a secondary PDP context manager;
the traffic detector module which scans each IP packet transmitted within the system between a user network and a satellite, the traffic detector module comprising the following sub-module:
a configured-TFTs traffic detector plugin adapted to detect criteria on the traffic on TFT created and upon detection to inform the secondary PDP context manager, the configured-TFTs traffic detector plugin comprises:
an input which receives information from the link configuration module,
an output which transmits information of presence or absence of flow related to activated TFTs to the secondary PDP context manager;
a TFTs management module adapted for asking the secondary PDP context manager for an available PDP context and to create one or more TFTs, according to a given configuration and to link the one or more created TFTs to the available PDP context allocated to a specified class, the TFTs management module comprising:
three inputs: a first input receiving the information from the link configuration module,
two inputs/outputs: linked up with a transceiver which allows communication of status creations or "get created status" instructions to a secondary PDP contexts management module which exchanges information of Get/release free PDP contents type, an output to the transceiver which will create TFTs rules and link them to an available context or else delete TFTs;

the secondary PDP context management module is adapted for activating or deactivating a relevant context, the secondary PDP context management module comprises:

three inputs: a first input which receives information from the link configuration module, a second input which receives information from the TFTs management module, a third input which receives information from configured-TFTs traffic detector plugin, an output which transmits the activation or deactivation commands for a corresponding context to the transceiver for all the secondary PDP contexts upon detection of a traffic flow by the traffic detector, wherein the traffic detector detects criteria in order to configure the TFTs via the TFTs management module and connect or disconnect secondary PDP context via the secondary PDP context management module.

2. The system according to claim 1, wherein the traffic detector module comprises a container module for plugins for creating or deleting TFTs comprising an input, receiving information from the link configuration module, an output transmitting information on parameters of analysed traffic, a class, to the TFTs manager via input, said container module comprising at least one of the following sub-modules:

a plugin for detecting specific packets which detects a simple packet which corresponds to a pattern or template, a plugin for detecting type of traffic, detecting the presence of a traffic flow of a specified type, and a plugin for detecting other traffic detecting other criteria characterizing the traffic flow.

3. The system according to claim 1, wherein the service manager comprises an external-events manager module comprising an input receiving information from the link configuration module and an output for transmitting information to the TFTs manager.

4. The system according to claim 1, wherein the Secondary PDP context management module comprises an input/output linked up with the transceiver for the request/response statuses for the contexts.

5. The system according to claim 1, used in an Inmarsat telecommunications system.

6. The system according to claim 1, used in a mobile telecommunications system.

7. The system according to claim 2, used in an Inmarsat telecommunications system.

8. The system according to claim 2, used in a mobile telecommunications system.

\* \* \* \* \*